(12) United States Patent
Yang et al.

(10) Patent No.: US 7,403,562 B2
(45) Date of Patent: Jul. 22, 2008

(54) MODEL BASED RATE CONTROL FOR PREDICTIVE VIDEO ENCODER

(75) Inventors: Kyeong Ho Yang, Freehold, NJ (US); Hyung Joon Kim, Alpharetta, GA (US)

(73) Assignee: EG Technology, Inc., Atlanta, GA (US)

( * ) Notice: Subject to any disclaimer, the term of this patent is extended or adjusted under 35 U.S.C. 154(b) by 459 days.

(21) Appl. No.: 11/074,661

(22) Filed: Mar. 9, 2005

(65) Prior Publication Data

US 2006/0203907 A1    Sep. 14, 2006

(51) Int. Cl.
*H04B 1/66* (2006.01)

(52) U.S. Cl. ................................. 375/240.03

(58) Field of Classification Search ............ 375/240.15, 375/240.16, 240.17, 240.18, 240.2, 240.03, 375/240, 240.04, 240.05, 240.12, 240.13; 348/402.1, 415; 382/224, 236; *H04B 1/66*
See application file for complete search history.

(56) References Cited

U.S. PATENT DOCUMENTS

| | | | | |
|---|---|---|---|---|
| 5,134,476 A | * | 7/1992 | Aravind et al. | 348/415.1 |
| 5,231,484 A | * | 7/1993 | Gonzales et al. | 375/240.04 |
| 5,412,430 A | * | 5/1995 | Nagata | 348/402.1 |
| 5,933,194 A | * | 8/1999 | Kim et al. | 348/403.1 |
| 5,990,957 A | * | 11/1999 | Ryoo | 375/240.03 |
| 6,011,589 A | * | 1/2000 | Matsuura et al. | 375/240.14 |
| 6,023,296 A | | 2/2000 | Lee et al. | |
| 6,072,831 A | * | 6/2000 | Chen | 375/240.03 |
| 6,192,075 B1 | * | 2/2001 | Jeng et al. | 375/240 |
| 6,275,614 B1 | * | 8/2001 | Krishnamurthy et al. | 382/224 |
| 6,434,196 B1 | * | 8/2002 | Sethuraman et al. | 375/240.12 |
| 6,690,833 B1 | * | 2/2004 | Chiang et al. | 382/236 |
| 7,095,784 B2 | * | 8/2006 | Chang et al. | 375/240.03 |
| 7,126,989 B2 | * | 10/2006 | Hagai et al. | 375/240.13 |

* cited by examiner

*Primary Examiner*—Tung Vo
(74) *Attorney, Agent, or Firm*—Needle & Rosenberg, P.C.

(57) ABSTRACT

A rate control algorithm for a predictive video encoder is provided to accurately control the coding rate while requiring a small complexity. The algorithm assumes the video encoder to consist of two processors, pre-processor and main processor, and the rate control located in main processor uses prediction cost and residual cost for each picture that are computed in pre-processor. Prediction cost represents the estimated number of bits needed to generate an error image, and residual cost describes the difficulty of encoding the resultant error image. Accurate and simple rate control is made possible by using a new rate model that adapts to the local characteristic of a video sequence, and by targeting to maintain the quantization parameter as constant as possible in a given set of pictures, GOP, instead of the conventional two step approach.

12 Claims, 2 Drawing Sheets

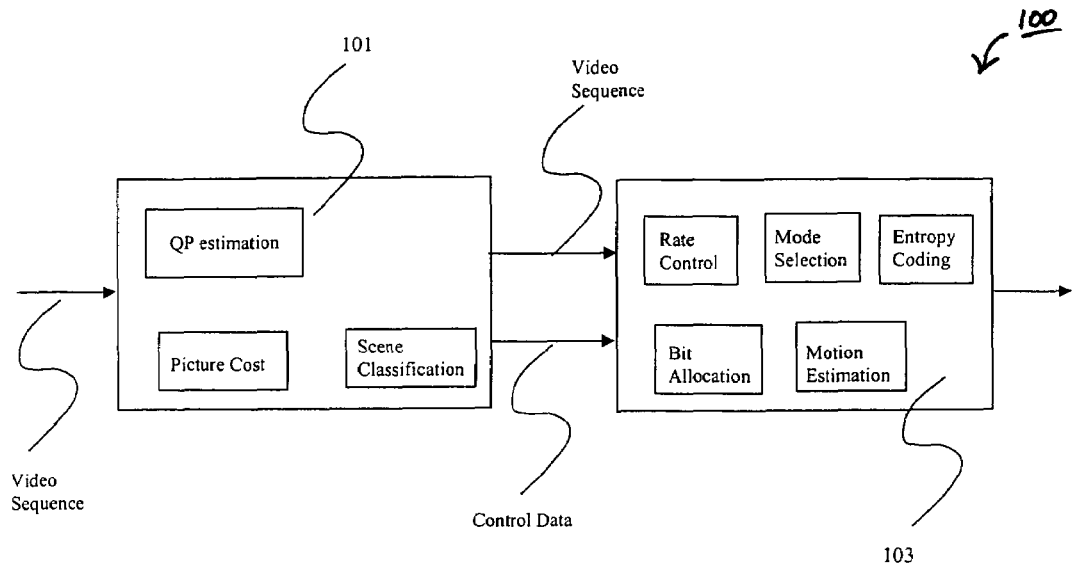

FIG. 1

```
static int    qpGOPtable[7]    = {10, 15, 20, 25, 30, 35,   40};
static int    qpGOPthres[7]    = {  1,  3, 15, 40, 75, 120, 0x7fff};
static int    qpGOPthreL[7]    = {  0,  0,  2, 10, 20, 60,  110};
static int    qpGOPthreH[7]    = {  1,  5, 25, 60,100, 150, 0x7fff};
static int    qp_pindex = -1;
gop_sad = sum of Mean Absolute Difference (intrapicture or interpicture) of all the pictures in the GOP;
gop_sad = gop_sad * 4 * Ref_Rate / (target_rate * 2*num_frames);
gop_sad = gop_sad * FrameSizeInMbs / Ref_MBNum;

if ((qp_pindex == -1) || new_scene)
{
if  (gop_sad < qpGOPthres[0])      qp_pindex = 0;
else if (gop_sad < qpGOPthres[1])  qp_pindex = 1;
else if (gop_sad < qpGOPthres[2])  qp_pindex = 2;
else if (gop_sad < qpGOPthres[3])  qp_pindex = 3;
else if (gop_sad < qpGOPthres[4])  qp_pindex = 4;
else if (gop_sad < qpGOPthres[5])  qp_pindex = 5;
else                               qp_pindex = 6;
}
else if (gop_sad < qpGOPthreL[qp_pindex])
       qp_index--;
else if (gop_sad > qpGOPthreH[qp_pindex])
       qp_index++;
qpGOP = qpGOPtable[qp_pindex];
```

FIG. 2

MODEL BASED RATE CONTROL FOR PREDICTIVE VIDEO ENCODER

BACKGROUND OF THE INVENTION

1. Field of the Invention

The present invention relates to video encoders, and more specifically to rate controlled predictive video encoders.

2. Discussion of the Related Art

Rate control is an essential function of most video encoders. This is due, in part, to the fact that while many encoders encode video as a variable bitrate stream, many applications require a constant bitrate stream. However, most video standards do not specify how to control the bit rate.

Conventional encoders control the output bitrate by varying the coarseness of the quantization step. Variation of the quantization scale directly affects the size of the output. Although coarse quantization significantly reduces the bitrate, it also reduces image quality. Accordingly, more advanced rate control algorithms are needed in order to distribute available bits in a manner that avoids visible artifacts in the displayed image.

Many rate control algorithms have been proposed, such as those disclosed ISO-IEC/JTC1/SC29/SG11, "MPEG2: Test Model 5," Draft, April 1993 and Zhihai He and Sanjit K. Mitra, "Optimum Bit Allocation and Accurate Rate Control for Video Coding via p-domain Source Modeling," *IEEE Transactions on Circuits and System for Video Technology*, October 2002. A look-ahead approach has also been introduced to rate control for stable rate control in case of noticeable change in the picture characteristic due to, for example, scene change. Such rate control schemes usually consist of two steps. The first step is to allocate bits to each picture in a given set of pictures to minimize the overall distortion. The second step is to find the quantization parameter that meets the number of bits allocated to encode the current picture. The rate control schemes identified above are used in the second step (i.e., selection of a quantization parameter). However, this two-step approach makes the rate control complicated.

SUMMARY OF THE INVENTION

Accordingly, the present invention is directed to a model based rate control algorithm for a predictive video encoder that substantially obviates one or more of the problems due to limitations and disadvantages of the related art.

An advantage of the present invention is that it provides accurate rate control while requiring much lower complexity than known rate control schemes. This is made possible by using a rate model that adapts to the local characteristic of a video sequence, and by targeting to maintain the quantization parameter as constant as possible in a given set of pictures, GOP, instead of the two step approach.

Another advantage of the present invention is that it provides a rate model that is a function of picture cost which adapts to the local characteristics of a video sequence.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for providing rate control in a predictive video encoder includes classifying pictures in a video sequence, estimating a first quantization parameter, calculating picture costs for each of the pictures in the video sequence based on the estimated quantization parameter, initializing rate control, performing bit allocation and quantization parameter selection based on the picture costs, and encoding the video sequence.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram of video encoder in accordance with an embodiment of the invention.

FIG. 2 illustrates exemplary pseudo-C code for estimating a quantization parameter according to an embodiment of the invention.

DETAILED DESCRIPTION OF THE ILLUSTRATED EMBODIMENTS

Figure 3:
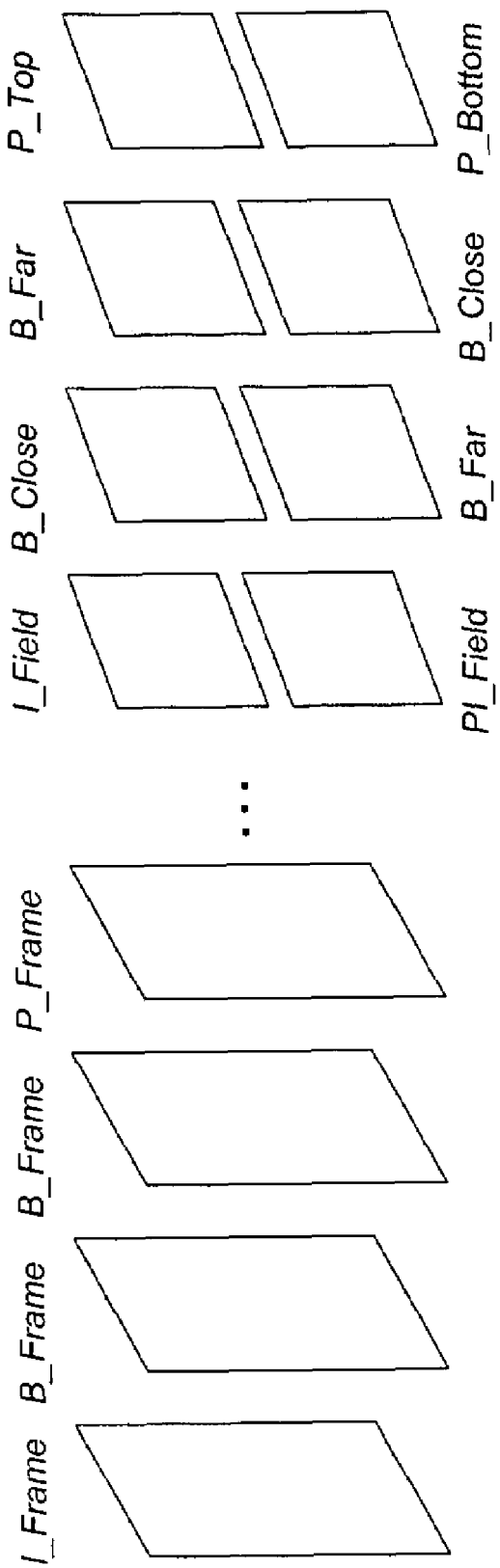
FIG. 3 illustrates exemplary picture categories according to an embodiment of the invention.

Reference will now be made in detail to an embodiment of the present invention, example of which is illustrated in the accompanying drawings.

The invention provides an adaptive rate control algorithm that is based on a rate model of a predictive video encoder. The rate model is a function of a cost, called picture cost, that is represented as a weighted sum of prediction cost and residual cost, and adapts to the local characteristic of a video sequence. Prediction cost, as used herein, represents the estimated number of bits needed to generate an error image, and residual cost, as used herein, describes the difficulty of encoding the resultant error image. An adaptive model is used to estimate the number of bits needed to encode a picture. Furthermore, the model can incorporate a scene change detector, still picture detector, and flash detector to more accurately adapt to the characteristics of the picture.

For purposes of example, the adaptive model according to the invention is described with regard to implementation in an H.264 video encoder with I, P and B pictures in a GOP structure. However, one skilled in the art would readily appreciate that the adaptive model of the invention can be applied to other video encoding system standards, such as any of the MPEG standards.

As shown in FIG. 1, an exemplary encoder 100 has two functional modules: pre-processor 101 and main processor 103. Pre-processor 101 reads a series of input video frames, detects scene changes, flash and/or still pictures, and decides the GOP size based on the information within the video frames. The pre-processor 101 also estimates a quantization parameter (QP) that is to be used to compute the prediction and residual costs of the pictures in a GOP. Main processor 103 processes each picture by performing rate control, motion estimation, mode selection, and entropy coding.

The first step of pre-processor 101 is to classify scenes to make rate control stable. The pre-processor 101 classifies scenes by determining scene changes, flash pictures, and still pictures. A scene change between picture n and the previous picture n−1 is determined based on the difference in mean values of co-located blocks of size M×N and the sum of absolute differences (SADs) of those blocks.

A scene change may be detected, for example, by comparing the difference between the mean value of the current picture and the mean value of the previous picture with a predefined threshold value and comparing the average of the difference between a current picture pixel and the corresponding pixel in the previous picture to determine the number of changes between the current picture and a previous picture. If the number of changes is greater than a threshold value, there has been a scene change.

Next, the pre-processor determines whether the detected scene change is an actual scene change or a flash picture instead. If the current picture n is determined as a scene change, but the next picture n+1 is similar to the previous picture n−1, the current picture is considered a flash picture instead of a scene change picture, and the flash flag is set to ON while the scene change flag is set to OFF.

When a still picture is detected, a flag is forwarded to the main processor along with the number of stationary macroblocks (num_still_mb) in the picture. An exemplary method of detecting still pictures begins by determining the number of still macroblocks in the picture. This is achieved, for example, by comparing the sum of the absolute differences (SADs) of the macroblocks to a specified threshold, StillMBthres. If the percentage of still macroblocks in the picture is larger than a specified value, for example, 96%, and the cost prediction is less than a specified threshold the picture is considered still.

The pre-processor also sets the GOP size, GOPSIZE, based on the location of scene changes or the maximum GOP size if a scene change does not occur within a specified number of pictures, for example, 15. A GOP usually has no more than one picture with the scene change flag set, and starts with an I picture.

Next the pre-processor estimates the quantization parameter, QP1 that is to be used to compute the prediction and residual costs of the pictures in a GOP. Both the prediction cost and the residual cost tend to increase as the quantization parameter decreases. Therefore, a significant difference between the quantization parameters used for cost computation (QP1) and the quantization parameters used for actual encoding (QP2) will result in the main processor failing to accurately estimate the number of bits required for each picture and consequently the processor fails to provide accurate rate control. In order to make prediction cost and residual cost of a picture more useful for rate control in the main processor, QP1 is estimated based on spatiotemporal complexity of the picture, the target bitrate, and the number of macroblocks per second. Since the use of different QPs for adjacent GOPs makes the costs less correlated, the QP from the previous GOP remains unchanged unless a scene change occurs, or there is a large change in scene complexity. FIG. 2 illustrates an exemplary pseudo-C code algorithm for estimating QP1.

Upon estimation of the quantization parameter, QP1, the pre-processor computes the costs. The prediction cost and the residual cost is computed for each picture in the current GOP, predCost[i] and resiCost[i], i=0,1, . . . , 2*GOPSIZE−1 in the field coding mode and i=0, 2, . . . , 2*GOPSIZE−2 for the frame coding mode. These costs are the sum of those for all the macroblocks in the picture and are used in bit allocation and rate control in the main processor. The prediction cost, predCost[i], represents the estimated number of bits needed to generate an error image (field or frame). The bits are mostly from inter-picture prediction and/or intra-picture prediction. The residual cost, resiCost[i], represents the cost of encoding the prediction error image. This could be, for example, sum of absolute difference (SAD), sum of absolute transformed difference (SATD), or any other measure describing the difficulty in encoding the error image. The pre-processor can also perform a simple motion estimation and a crude coding mode decision in order to more accurately compute the costs.

Main processor 103 encodes each picture by performing, for example, rate control, sub-pel motion estimation, mode selection, and entropy coding.

Bit allocation and QP estimation for the current picture is performed in the main processor by looking at the buffer status and all the remaining pictures in the current GOP. The model based rate control algorithm according to the invention aims to meet a given relationship of QPs to be assigned to different pictures. The relationship could be dependent on another processing unit and the complexity of each picture and/or the picture type. For example the QP could be maintained as constant as possible over the current GOP with a little bigger, e.g., +2, QP for B pictures. A bigger QP is assigned to encoding B pictures since B pictures are not used as reference pictures in prediction of other pictures. The number of bits required to encode each picture is estimated using the prediction cost, predCost[i], and the residual cost, resiCost[i], received from the pre-processor and the characteristic of the category to which each picture belongs.

Accordingly to an exemplary embodiment of the invention, pictures within a GOP are classified into categories to accurately characterize different coding schemes and availability of certain reference pictures. For example, the pictures could be categorized in one of the following nine categories: P frames (P_Frame); P top fields (P_Top); P bottom fields with more than one reference fields (P_Bottom); B frames (B_Frame); B fields coded with a reference field that is one field away (B_Close); B fields coded without having a reference field that is one field away (B_Far); I frames (I_Frame); I fields (I_Field); and P bottom fields coded with only one reference field (PI_Field). The PI_Field is for the bottom field of the first frame in each GOP when the field is not allowed to refer pictures in the previous GOP. FIG. 3 illustrates the picture categories according to an exemplary embodiment of the invention.

Each category is characterized by a structure, such as that shown below, that contains the following: the average QP used to encode the pictures in the specific category; the average prediction cost for the category; the average residual cost for the category, the relationship between the prediction cost and the actual number of bits used; the relationship between the residual cost and the actual number of bits used to encode transform coefficients; the actual number of bits used to encode the picture; and the total picture cost.

The $j^{th}$ category of pictures is characterized by a structure RefRCdata[j] that contains the followings:

RefRCdata[j].QP2: which represents the average QP used to encode the pictures in the category;

RefRCdata[j].predCost: which represents the average prediction cost;

RefRCdata[j].resiCost: which represents the average residual cost;

RefRCdata[j].pred_cw: which represents the relationship between predCost and actual number of bits used in prediction, computed as the actual number of bits for prediction divided by the average prediction cost;

RefRCdata[j].resi_cw: which represents the relationship between resiCost and actual number of bits to encode transform coefficients, computed as the actual number of bits for residual cost divided by the average residual cost;

RefRCdata[j].outBits: which represents the actual number of bits used to encode the picture; and $$RefRCdata[j].pictureCost := pred\_cw * predCost + resi\_cw * resiCost \quad \text{Eq. (1)}$$

Given the size of the GOP and the cost information, the rate control algorithm of the main processor performs three main functions: initialization of rate control; bit allocation and QP selection, and Updating the reference data.

Rate control is initialized before processing each GOP as follows.

First, the prediction cost, predCost[i], and the residual cost, resiCost[i], for all the pictures in the GOP and the quantization parameter, QP1, that was used in pre-processor are read. The target number of bits to encode the remaining pictures in the GOP, target_bits_gop, is set using equation (2)

$$target\_bits\_gop = average\_bits\_gop - bufferStatus/2. \quad \text{Eq. (2)}$$

If the scene change flag is set, then the information in RefRCData[j], j=0, ..., 8 is reset. In order to reset RefRCData[j] accurately, the relationships, init_actual_pred_bits versus predcost and init_actual_resi_bits versus resiCost, are determined by off-line training.

In order to reset RefRCData[j] accurately, the relationships, init_actual_pred_bits versus predCost and init_actual_resi_bits versus resiCost, are obtained by off-line training with many sequences separately for the three different picture types (I, P, & B), QP1 (from Pre Processor), and QP2 (to be used in encoding the current picture). A curve fitting technique is performed using the piecewise linear approximation method. Using the functions, RefRCData[j] is reset as follows:

Using cost information and picture coding type from the pre-processor and the initialization function for QP1, the QP2 that provides bits closest to target_bits_gop given in Eq. (2) is found. Next, the average of predCost and resiCost over the GOP for each category indexed by j is calculated, and stored respectively in RefRCdata[j].predCost and RefRCdata[j].resiCost.init_actual_pred_bits and init_actual_resi_bits respectively corresponding to the average values of predCost and resiCost are obtained using the initialization functions for QP1 and QP2. Then, pred_cw and resi_cw are computed using $$RefRCdata[j].pred\_cw = init\_actual\_pred\_bits / RefRCdata[j].predCost \text{ and}$$

$$RefRCdata[j].resi\_cw = init\_actual\_resi\_bits / RefRCdata[j].resiCost$$

Finally, RefRCdata[j].pictureCost is computed using Eq. (1) and the same value is stored in RefRCdata[j].outBits.

After initialization of rate control, the main processor performs bit allocation and QP selection. Accordingly to an embodiment of the invention, the main processor estimates the number of bits and QP (QP2) to encode the current picture indexed by k using the information received from the pre-processor and the updated reference data stored in RefRCdata[j] as follows:

STEP 1: For the $k^{th}$ picture, the quantization parameter for the GOP, gopQP, is computed as a weighted average of QPs stored in RefRCdata:

$$gopQP = \Sigma_{i \geq k} RefRCdata[j = ref\_index[i]].QP2 / \Sigma_{i \geq k} I(i), \quad \text{Eq. (3)}$$

where ref_index[i] is the category that the $i^{th}$ picture belongs to and I(i)=1 if the picture indexed by i belongs to the current GOP and 0 otherwise. QP2 for B pictures is adjusted by -2 before being added.

STEP 2: The picture cost for the pictures in the GOP, picturecost[i] (i≧k) is calculated using equation (1).

STEP 3: Calculate the number of bits used to encode the $i^{th}$ picture with QP=gopQP, out_bits(i, gopQP), using equation (4).

$$out\_bits(i, gopQP) = RefRCdata[j].outBits * (pictureCost[i]/RefRCdata[j].pictureCost)\beta[j]^{RefRCdata[j].QP2-gopQP}, \quad \text{Eq. (4)}$$

where j=ref_index[i] and β[j] represents increase or decrease of bits respectively with decrement or increment of QP by 1. β[j] can be obtained by offline training. Eq. (4) assumes that the total number of out bits is proportional to the pictureCost obtained by Eq. (1). Then, the number of bits needed to encode all the remaining pictures with QP=gopQP is calculated:

$$bits\_total(gopQP) = \Sigma_{i \geq k} out\_bits(i, gopQP), \quad \text{Eq. (5)}$$

STEP 4: Find QP2 that generates bits_total(QP) closest to target_bits_gop by adjusting QP appropriately according to the difference between bits_total(QP) and target_bits_gop:

$$out\_bits(i, QP2) = out\_bits(i, gopQP) * \beta[j]^{gopQP-QP2}, \quad \text{Eq. (6)}$$

$$bits\_total(QP2) = \Sigma_{i \geq k} out\_bits(i, QP2). \quad \text{Eq. (7)}$$

STEP 5: If the picture k belongs to B_Frame, B_Close, or B_Far, increase QP2 by 2.

After encoding the picture k, the reference data, RefRCdata[j=ref_index[k]], and the parameters for rate control are updated as follows:

STEP 1: Update target_bits_gop as follows:

$$errorBits = actualOutBits - out\_bits(k, QP2),$$

$$target\_bits\_gop = target\_bits\_gop - actualOutBits + errorBits/2. \quad \text{Eq. (8)}$$

Eq. (8) is to effectively allocate bits to encoding of the next picture in case the estimation error for the current picture is somewhat big.

STEP 2: Set j=ref_index[k], category that the picture k belongs to.

STEP 3: If the picture k is the first picture in the category j in the current scene, set γ to 1. Otherwise compute γ as follows:

$$pCost\_c = RefRCdata[j].pred\_cw * predCost[k] + RefRCdata[j].resi\_cw * resiCost[k]$$

$$pCost\_r = RefRCdata[j].pred\_cw * RefRCdata[j].predCost + RefRCdata[j].resi\_cw * RefRCdata[j].resiCost[k]$$

$$\gamma = f(|pCost\_c - pCost\_r| / max(pCost\_c, pCost\_r)). \quad \text{Eq. (9)}$$

The γ is a weighting factor used to update RefRCdata[j] in Eqs. (10)-(14), and represents how much different the picture k is from the previously encoded pictures in the same category. As can be seen in the equations, more weight can be given on the characteristic of the just encoded picture if the picture seems to be very different from the previous ones.

STEP 4: Update QP2 for the category j:

$$QP2\_ref = RefRCdata[j].QP2$$

$$RefRCdata[j].QP2 = \gamma * QP2 + (1-\gamma) * QP2\_ref \quad (10)$$

STEP 5: Get pred_cw[k] and resi_cw[k] for the picture k from the actual encoding statistics that are respectively actual_pred_bits[k]/predCost[k] and actual_resi_bits[k]/resiCost[k].

STEP 6: Adjust pred_cw and resi_cw and then update RefRCdata[j].pred_cw and RefRCdata[j].resi_cw:

$$pred\_cw\_ref = RefRCdata[j].pred\_cw * \beta[j]^{QP2-ref-RefRCdata[j].QP2}$$

$$resi\_cw\_ref = RefRCdata[j].resi\_cw * \beta[j]^{QP2-ref-RefRCdata[j].QP2}$$

$$pred\_cw\_k = pred\_cw[k] * \beta[j]^{QP2-ref-QP2}$$

$$resi\_cw\_k = resi\_cw[k] * \beta[j]^{QP2-ref-QP2}$$

$$RefRCdata[j].pred\_cw = \gamma * pred\_cw\_k + (1-\gamma) * pred\_cw\_ref$$

$$RefRCdata[j].resi\_cw = \gamma * resi\_cw\_k + (1-\gamma) * resi\_cw\_ref \qquad \text{Eq. (11)}$$

STEP 7: Adjust outBits and then update RefRCdata[j].outBits as:

$$outBits\_ref = RefRCData[j]outBits * \beta i\ [j]^{QP2-ref-RefRCdata[j].QP2}$$

$$outBits\_k = actualOutBits * \beta[j]^{QP2-ref-QP2}$$

$$RefRCdata[j].outBits = \gamma * outBits\_k + (1-\gamma) * outBits\_ref \qquad \text{Eq. (12)}$$

STEP 8: Update RefRCdata[j].predCost and RefRCdata[j].resiCost as:

$$RefRCdata[j].predCost = \gamma * predCost[k] + (1-\gamma) * RefRCdata[j].predCost \qquad \text{Eq. (13)}$$

$$RefRCdata[j].resiCost = \gamma * resiCost[k] + (1-\gamma) * RefRCdata[j].resiCost \qquad \text{Eq. (14)}$$

STEP 9: Update RefRCdata[j].pictureCost using Eq. (1).

With the number of bits allocated to the current picture k, out_bits(k, QP2), and cost information for each macroblock obtained as disclosed above, the rate control can easily be extended to macroblock layer rate control. Macroblocks can be classified into, for example, 5 categories (indexed by j, 0-4):

MB_Normal_H (j=0): Normal MBs with data to which human eyes are very sensitive; MB_Normal_M (j=1): Normal MBs with data to which human eyes are not very sensitive; MB_Normal_L (j=2): Normal MBs with data to which human eyes are not sensitive; MB_Random (j=3): MBs with random signal or similar to that; and MB_Still (i=4): no movement at all The $j^{th}$ category of MBs is characterized by a structure RefMBdata[j], that contains the followings:

RefMBdata[j].QP2: average QP used to encode the MBs in the category

RefMBdata[j].predCost: average prediction cost

RefMBdata[j].resiCost: average residual cost

RefMBdata[j].pred_cw: relationship between predCost and actual number of bits used in prediction. It is computed as actual_number_of_bits_for_prediction/predCost.

RefMBdata[j].resi_cw: relationship between resiCost and actual number of bits to encode transform coefficients. It is computed as actual_number_of_bits_for_residual/resiCost.

RefMBdata[j].outBits: Actual number of bits used to encode the MB $$RefMBdata[j].MBCost := pred\_cw * predCost + resi\_cw * resiCost \qquad \text{Eq. (15)}$$

At the time of encoding the $l^{th}$ MB the aim is to find QP to be used to encode the current MB and all the ensuing macroblocks meeting the bit budget requirement. A small difference in QP can be applied to each category j as in Eq. (16):

$$QP_{Mb}[j] = QP + d[j]. \qquad \text{Eq. (16)}$$

This approach is very similar to the B picture case above where the QP for B pictures was increased by 2. An example for d[j] is as follows:

$$d[0] = -2,\ d[1] = 0,\ d[2] = 2,\ d[3] = 5,\ d[4] = 0. \qquad \text{Eq. (17)}$$

Eq. (17) assigns a bigger QP to MBs to which human eyes are less sensitive, and a smaller QP to those to which human eyes are more sensitive.

Then, if the GOP in the picture layer rate control is replaced by Picture and Picture by MB, a MB layer rate control algorithm is provided.

Similarly the inventive rate model can be extended to a case of slice layer rate control.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

Even though the proposed algorithm can also be applied to slice layer rate control and/or MB layer rate control, we describe only picture layer rate control in detail, and explain how we can extend it to slice or macroblock later rate control briefly.

Even though the rate control method has only been described for the case of using a fixed window called GOP where the number of remaining pictures in the window decreases until the start of the next GOP is detected, the method can easily be modified to use a sliding window that consists of a fixed number of frames, for example 15. In this case, some frames in the window may belong to a different GOP from others.

The method can also be modified to have a fixed window comprising a plurality of consecutive GOPs instead of one GOP to better control the rate by looking ahead more frames. In case of using two GOPs and 15 frames for each GOP, the number of frames in the window becomes 30 at the start of each GOP and decreases to 15 at the end of each GOP.

What is claimed is:

1. A method of performing rate control in a predictive video encoder, comprising:
    classifying pictures in a video sequence into respective categories;
    estimating a first quantization parameter;
    calculating a respective prediction cost and residual cost for each of the pictures in the video sequence based on the estimated quantization parameter;
    initializing rate control data for each category;
    computing a respective picture cost for each picture using the respective prediction cost and residual cost, and the rate control data for the respective category;
    performing bit allocation and quantization parameter selection for a picture selected from the video sequence using the respective picture cost and the respective rate control data for all the pictures in a respective group of pictures to which the selected picture belongs;
    encoding the selected picture;
    updating the rate control data for the respective category; and performing bit allocation and quantization parameter selection for a second picture selected from the video sequence using the respective picture cost and the respective rate control data for all the pictures in a respective group of pictures to which the second picture belongs.

2. The method of claim 1, wherein the picture cost is a weighted sum of prediction cost and residual cost.

3. The method of claim 2, wherein the prediction cost is an estimate of the number of bits needed to generate an error image, and the residual cost describes the difficulty of encoding the resultant error image.

4. The method of claim 1, wherein classifying pictures in the video sequence comprises:
detecting scene changes in the video sequence; and
setting a group of picture (GOP) size based on the detected scene changes.

5. The method of claim 1, further comprising:
classifying each picture in a GOP, wherein the categories characterize different coding schemes and availability of certain reference pictures for encoding pictures in each category.

6. The method of claim 5, wherein each category is characterized by the average quantization parameter used to encode the pictures in a specific category, the average prediction cost for the category, the average residual cost for the category, the relationship between the prediction cost and the actual number of bits used, the relationship between the residual cost and the actual number of bits used to encode the picture, and the total picture cost.

7. The method of claim 1, wherein the rate control data comprises:
data representing the quantization parameter used to encode the pictures in a category;
data representing average prediction costs;
data representing average residual costs;
data representing the relationship between the prediction cost and an actual number of bits used in prediction;
data representing the relationship between the residual cost and an actual number of bits used to encode transform coefficients; and
data representing the actual number of bits used to encode a picture.

8. The method of claim 1, wherein updating the control data comprises:
calculating a quantization parameter for the GOP as a weighted average of quantization parameters stored in the control data;
calculating the picture cost for the pictures in the GOP;
calculating the number of bits used to encode the ith picture; and
calculating a quantization parameter that generates a number of bits closest to the target number of bits.

9. A predictive video encoder, comprising:
a pre-processor configured to
classify pictures in a video sequence into respective categories,
estimate a first ciuantization parameter, and
calculate a respective prediction cost and residual cost for each of the pictures in the video sequence based on the estimated quantization parameter; and
a main processor configured to initialize rate control data for each category,
compute a respective picture cost for each picture using the respective prediction cost and residual cost, and the rate control data for the respective category,
perform bit allocation and ciuantization parameter selection for a picture selected from the video sequence using the respective picture cost and the respective rate control data for all the pictures in a respective group of pictures to which the selected picture belongs,
encode the selected picture,
update the rate control data for the respective category, and
perform bit allocation and ciuantization parameter selection for a second picture selected from the video seciuence using the respective picture cost and the respective rate control data for all the pictures in a respective group of pictures to which the second picture belongs.

10. The encoder of claim 9, wherein the picture cost is a weighted sum of prediction cost and residual cost.

11. The encoder of claim 10, wherein prediction cost is an estimate of the number of bits needed to generate an error image, and residual cost describes the difficulty of encoding the resultant error image.

12. The encoder of claim 9, wherein the pre-processor is further configured to:
classify scenes by determining scene changes, flash pictures, and still pictures in the video sequence; and
set the GOP size based on the classification of scenes.

* * * * *